Sept. 19, 1967 W. C. BERGSTROM 3,342,408
CENTRIFUGAL SEPARATION SYSTEM
Filed April 10, 1963 8 Sheets-Sheet 1

INVENTOR
WILLIAM C. BERGSTROM
BY Robert B. Buckley
ATTORNEY

Sept. 19, 1967  W. C. BERGSTROM  3,342,408
CENTRIFUGAL SEPARATION SYSTEM

Filed April 10, 1963   8 Sheets-Sheet 2

INVENTOR
WILLIAM C. BERGSTROM

BY Robert B. Buckley
ATTORNEY

Sept. 19, 1967   W. C. BERGSTROM   3,342,408
CENTRIFUGAL SEPARATION SYSTEM
Filed April 10, 1963   8 Sheets-Sheet 3

INVENTOR
WILLIAM C. BERGSTROM
BY Robert B. Buckley
ATTORNEY

INVENTOR
WILLIAM C. BERGSTROM

BY Robert B. Buckley
ATTORNEY

Sept. 19, 1967 W. C. BERGSTROM 3,342,408
CENTRIFUGAL SEPARATION SYSTEM
Filed April 10, 1963 8 Sheets-Sheet 8

INVENTOR
WILLIAM C. BERGSTROM
BY Robert B. Buckley
ATTORNEY

United States Patent Office 3,342,408
Patented Sept. 19, 1967

3,342,408
CENTRIFUGAL SEPARATION SYSTEM
William C. Bergstrom, P.O. Box 48–236, Miami, Fla. 33148; Robert W. Bergstrom, executor of said William C. Bergstrom, deceased
Filed Apr. 10, 1963, Ser. No. 272,019
28 Claims. (Cl. 233—18)

This application is a continuation-in-part of my following two applications:

(1) Ser. No. 7,045 filed Feb. 5, 1960, which in turn was a continuation of applications Ser. No. 750,632 filed July 24, 1958, and (2) Ser. No. 124,957 filed July 18, 1961, which in turn was a continuation of Ser. No. 816,231 filed May 27, 1959. All of these applications are now abandoned.

This invention relates to the centrifugal separation of mixtures of materials having different densities. More particularly, this invention relates to the centrifugal separation of materials to obtain one or more of the component materials in purified form. Among the uses of the invention are: cleaning impure or dirty lubricating oil in engine systems, separating water from jet engine fuel, separating water from gasoline, and the like.

Heretofore, centrifugal separators have been provided for separating mixtures of materials of different densities. In such separators, the mixture has been fed to the interior of a hollow rotating drum. The mixture is caused to rotate in the drum. Because of the difference in the densities of the materials, the heavier material collects in a layer outwardly of the lighter material. Pipes have been provided for removing one or more of the separated materials.

Some prior devices have failed to produce adequate separation of the different materials in the mixture. In other prior devices, the outlets have been located where incomplete separation has been obtained.

The present invention resides in the concept of a centrifugal system providing separators of simple construction for efficiently separating mixtures of materials of different densities and improved processes of centrifugal separation.

The invention provides centrifugal separators of durable and simple construction that require a minimum of maintenance for efficient operation throughout long service periods. The heavier materials are collected in zones or sludge traps inside the separator. The heavier materials can be removed upon periodic cleanings of the separator or upon periodic discharges of the zones collecting the heavier materials. The pure separated lighter materials are continuously removed from the separator.

The separators are so constructed that it is not necessary to remove the separator from the engine to perform the cleaning operation unless space limitations require such removal.

The separators of the invention can be mounted in aircraft engine systems for cleaning the lubricating oil.

The invention further provides centrifugal separators wherein, upon failure of the power drive causing rotation, there is no restriction to normal oil flow through the separator.

The invention further provides centrifugal separators wherein the separated lighter material is rapidly and efficiently removed directly in a radial direction partly by the inertia produced by the rotation of the material.

The invention further provides centrifugal separators wherein the heavier materials, such as sludge, collect in a removable and disposable element. When cleaning the separator, the disposable element, containing the sludge, is removed, discarded, and replaced by a clean disposable element. Thereby, the cleaning of the disposable element is unnecessary; and contamination of subsequent mixtures by prior sludge is eliminated.

The invention further provides improved processes for centrifugal separation wherein sufficient pressure is maintained in the rotating mixture in the rotor to prevent the formation of a vacuum at the axis of the rotor. Thereby, the purified lighter material collects at the axis, from where it is removed from the separator.

The invention further provides a two-stage centrifugal separator wherein, for example in purifying lubricating oil, sludge and large metal fragments are removed in the first stage, and the partially-purified oil is passed to the second-stage where finer metal particles are separated from the oil. The purified oil is continuously removed from the second stage for return to the engine.

For a better understanding of the invention and its other objects, advantages and details, reference is now made to the presently preferred embodiments of the invention which are shown, for purpose of illustration only, in the accompanying drawings.

Figure 1:
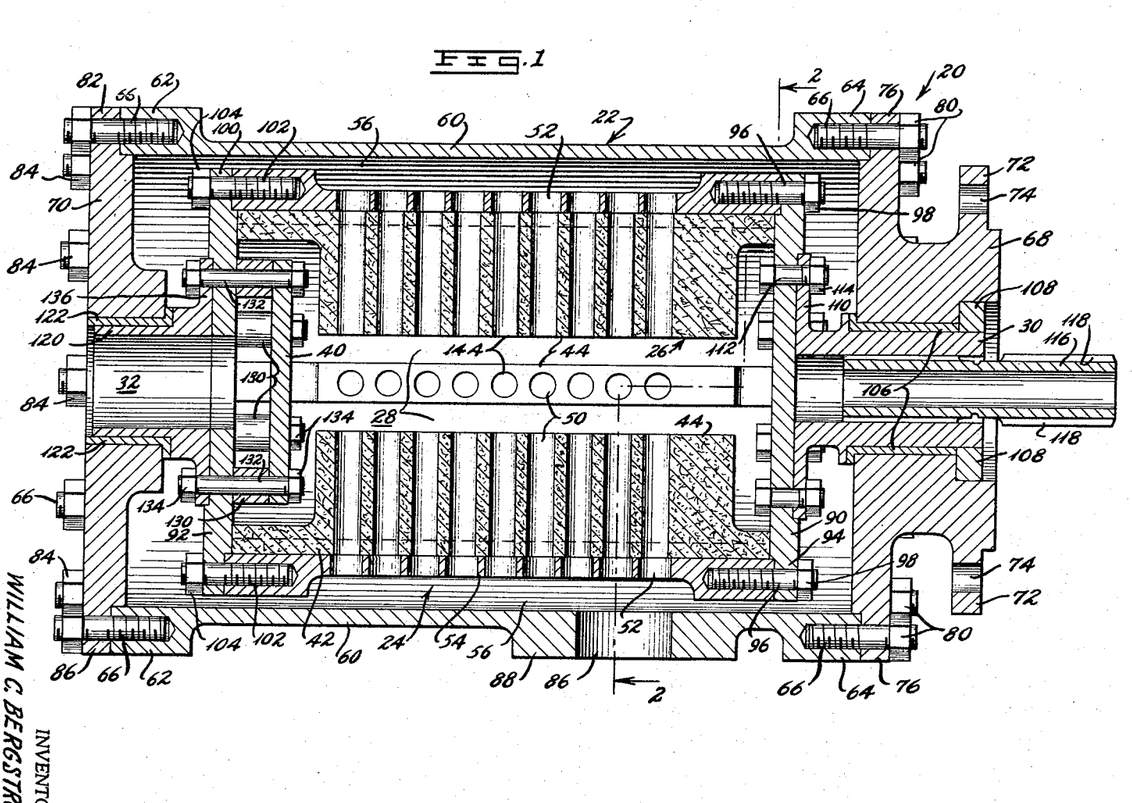
FIGURE 1 is a vertical longitudinal section through a centrifugal separator according to the invention including a housing, rotor, and a replaceable cartridge inside the rotor.
Figure 2:
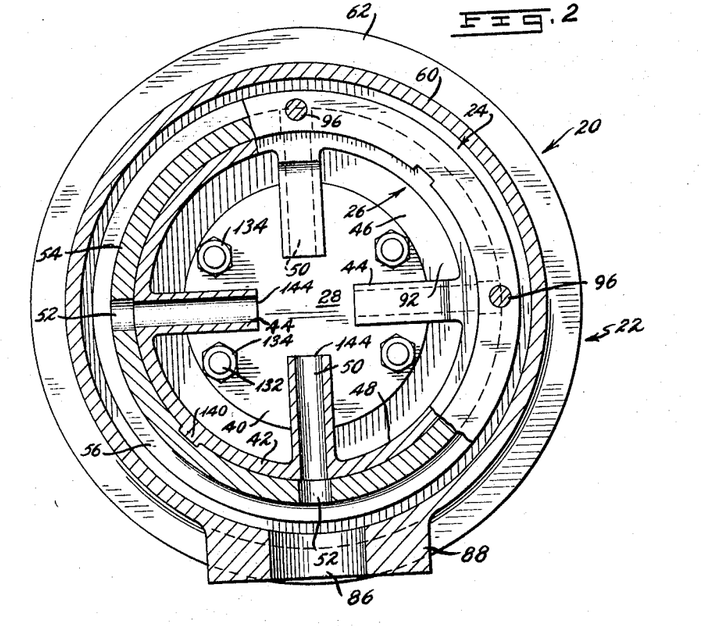
FIGURE 2 is a broken transverse vertical section on line 2—2 of FIGURE 1.
Figure 3:
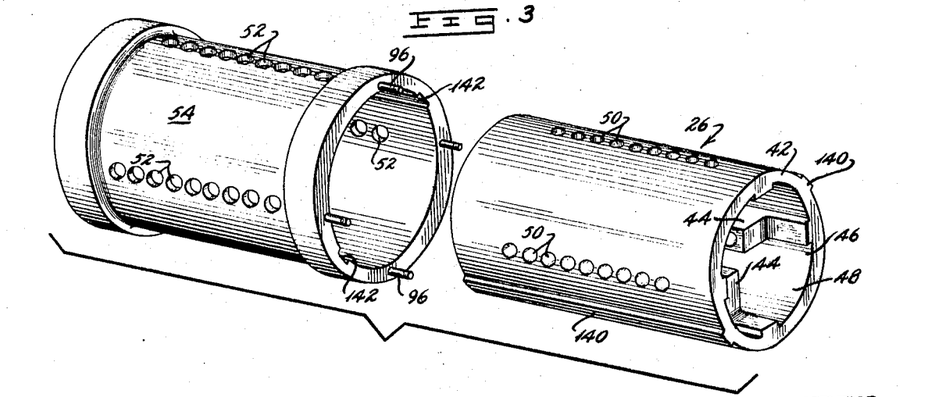
FIGURE 3 is an exploded view of the cartridge and rotor casing of the separator of FIGURES 1 and 2.

The embodiment of the invention shown in FIGURES 1 to 3, briefly stated, includes a housing having an inlet opening for the entry of a mixture of materials to be separated and an egress opening for the outflow of separated lighter material. A hollow rotor is rotatably supported inside the housing and has a drive connection to a source of power for rotating the rotor inside the housing.

The inlet opening extends into the rotor for supplying the mixture of materials, such as dirty lubricating oil, to the interior of the rotor. A baffle is mounted inside the rotor for initially directing the dirty oil outwardly.

The rotor includes a hollow cartridge removably received inside the rotor wall. The cartridge can be formed of low-cost, disposable material such as synthetic resin plastic. The sludge and other heavier materials collect on the inner surface of the shell of the cartridge. The cartridge has vanes extending inwardly from its shell for accelerating to rotation the dirty oil. For the outflow of purified oil, the cartridge has outlet channels extending through the vanes and the shell and registering with holes formed in the wall of the rotor so as to provide a passage for the purified oil to pass from the unobstructed axial zone of the cartridge to the space between the rotor and the housing and out through the egress opening.

The housing and rotor are provided with removable elements to permit access to and removal of the cartridge upon servicing of the separator. The dirty cartridge, having the separated sludge and other impurities therein, is discarded and replaced with a clean cartridge.

Figure 4:
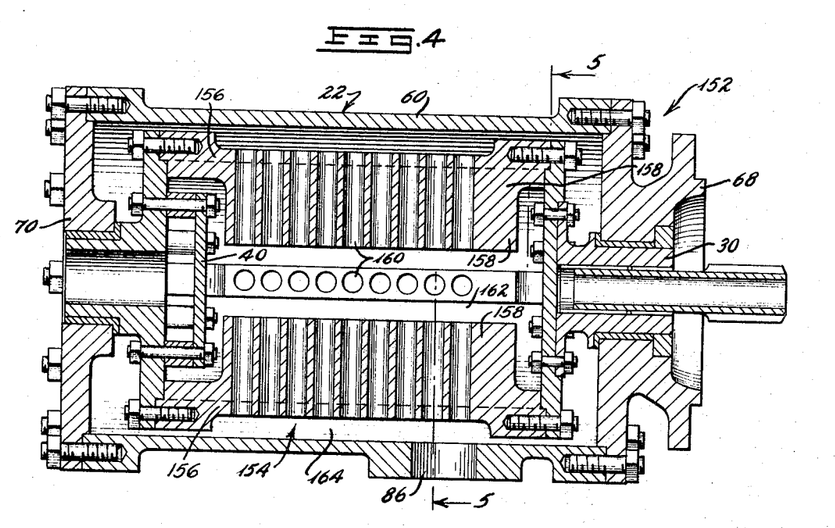
FIGURE 4 illustrates another form of the invention and is a vertical longitudinal section through a centrifugal separator including a housing and a rotor having integral vanes with radial channels formed therein.
Figure 5:
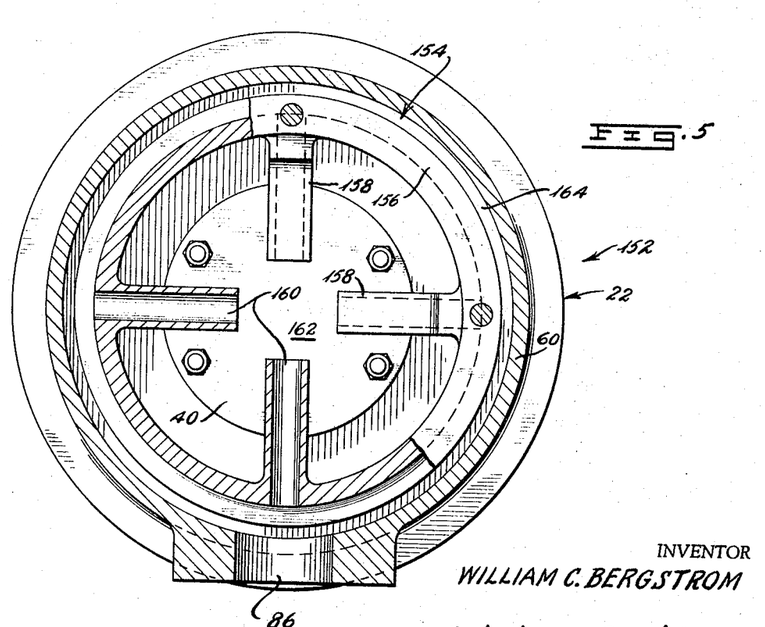
FIGURE 5 is a broken transverse vertical section on the line 5—5 of FIGURE 4.

The embodiment of the invention shown in FIGURES 4 and 5 is generally similar to that shown in FIGURES 1 to 3. It differs in that there is not cartridge in the rotor. Rather the rotor casing has vanes integral therewith and extending inwardly for accelerating the dirty oil to rotation. The entire rotor can be formed of disposable material, such as synthetic resin plastic, so as to be discarded and replaced upon serving of the separator.

Figure 6:
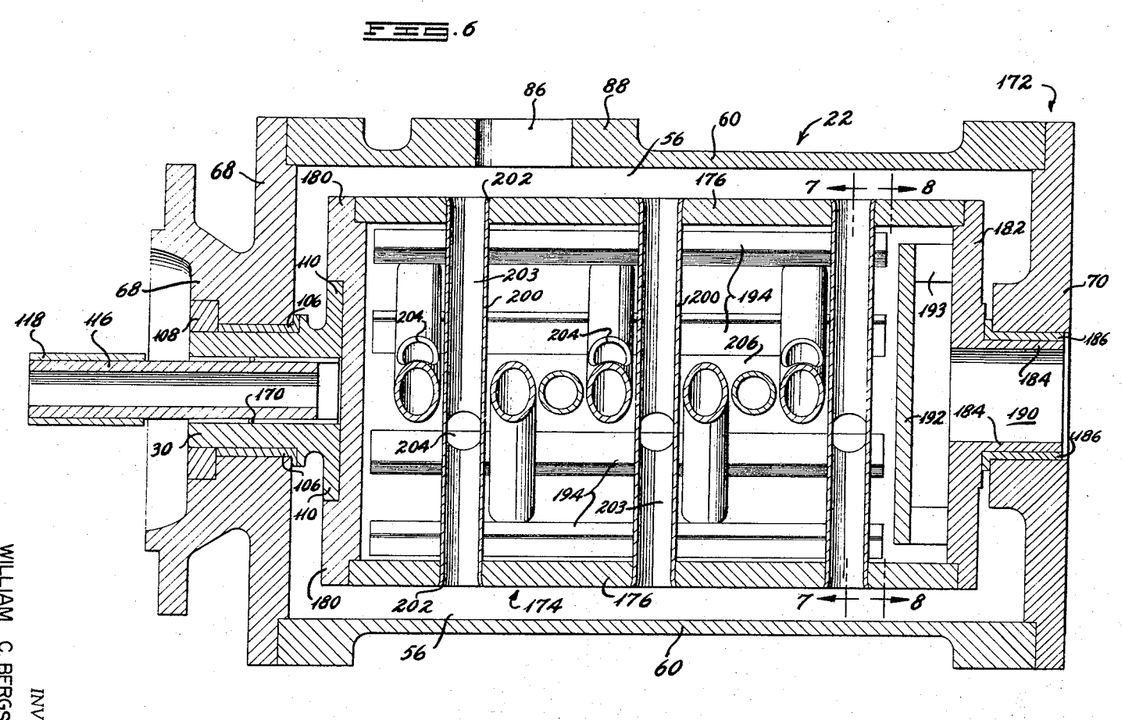
FIGURE 6 illustrates another embodiment of the invention and is a vertical longitudinal section through a centrifugal separator including a housing and a rotor with diametral outlet pipes having entrance openings adjacent the axis.
Figure 7:
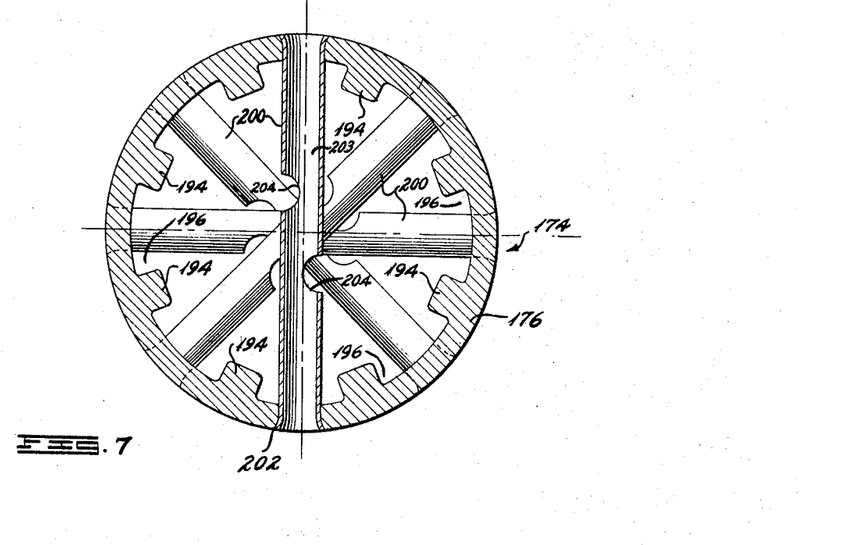
FIGURE 7 is a transverse vertical section on the line 7—7 in FIGURE 6 and shows the structure of the rotor.
Figure 8:
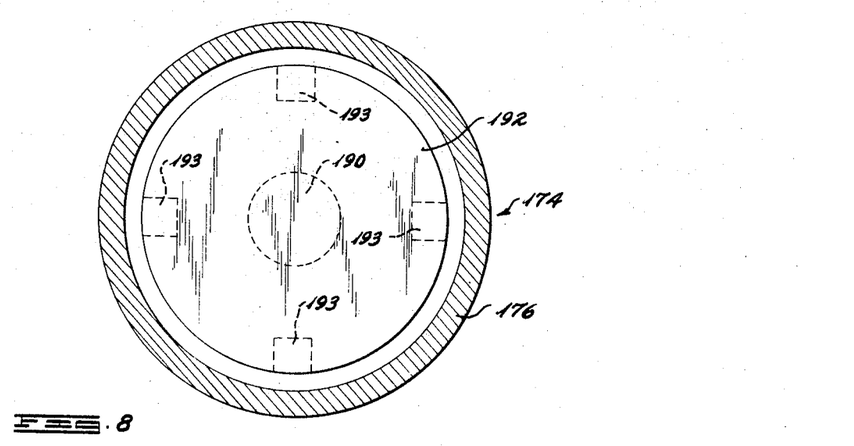
FIGURE 8 is a transverse vertical section on the line 8—8 of FIGURE 6.

In the embodiment of the invention illustrated in FIGURES 6 to 8, the rotor is provided wtih outlet pipes extending substantially along diameters of the rotor and anchored or fixed in the rotor casing at both ends. For the entry of purified oil into the pipes, entrance openings are formed in the pipes on opposite sides of the axis and adjacent thereto.

Figure 9:
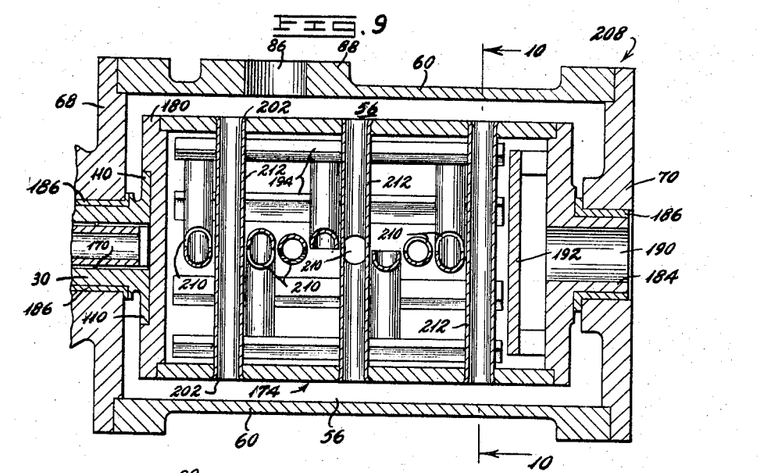
FIGURE 9 illustrates another embodiment of the invention and is a vertical longitudinal section through a centrifugal separator including a housing and a rotor with diametral outlet pipes having entrance openings at the axis.
Figure 10:
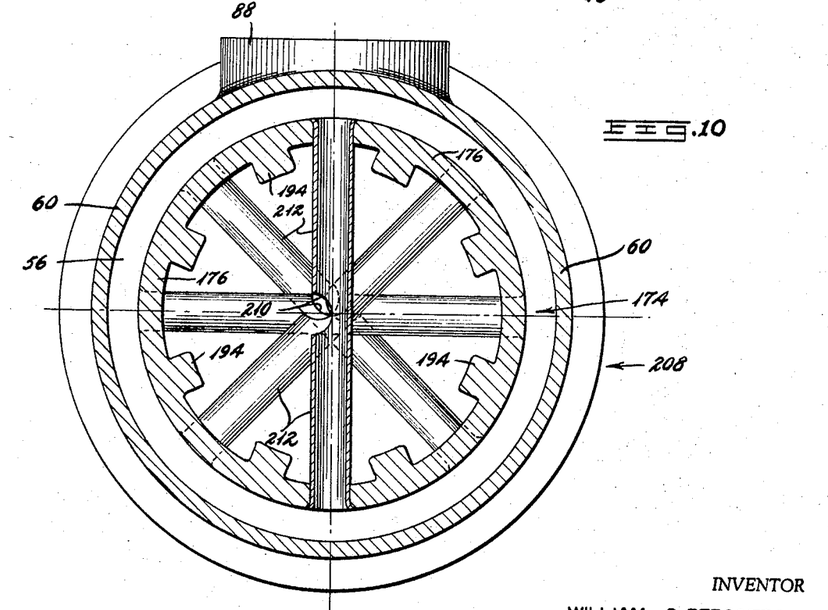
FIGURE 10 is a transverse vertical section on the line 10—10 in FIGURE 9.

The embodiment of the invention shown in FIGURES 9 and 10 is similar to that shown in FIGURES 6 to 8. It differs in that the entrance openings formed in the outlet pipes are located at the axis.

Figure 11:
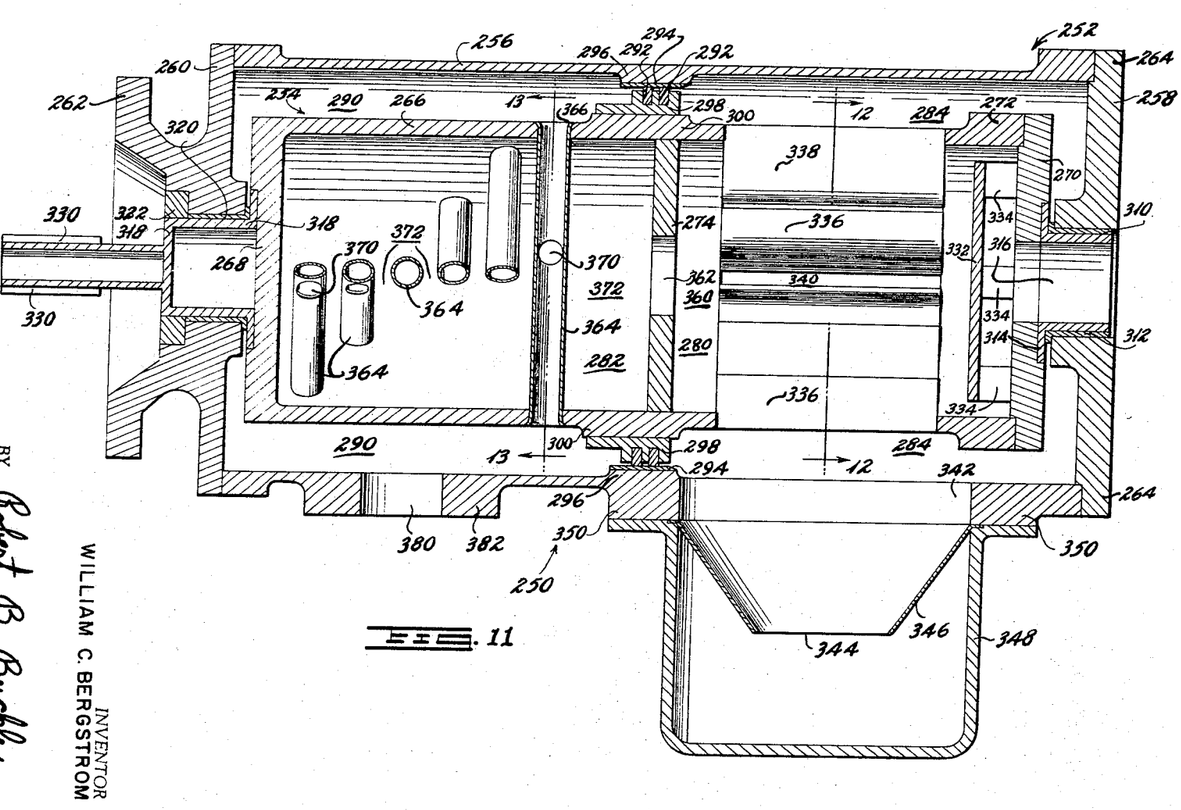
FIGURE 11 illustrates another embodiment of the invention and is a vertical longitudinal section through a two-stage centrifugal separator.
Figure 12:
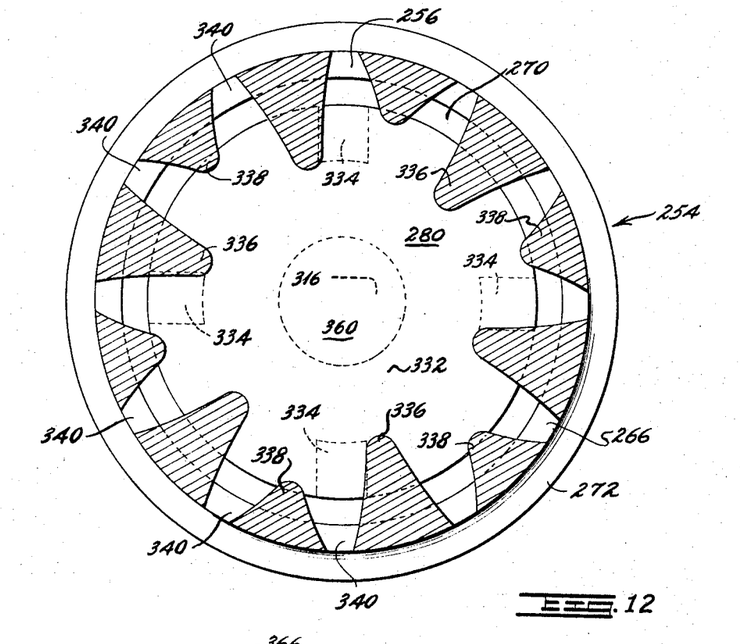
FIGURE 12 is a partial transverse vertical section on the line 12—12 of FIGURE 11 and showing the rotor; and, FIGURE 13 is a partial transverse vertical section on the line 13—13 of FIGURE 11.
Figure 13:
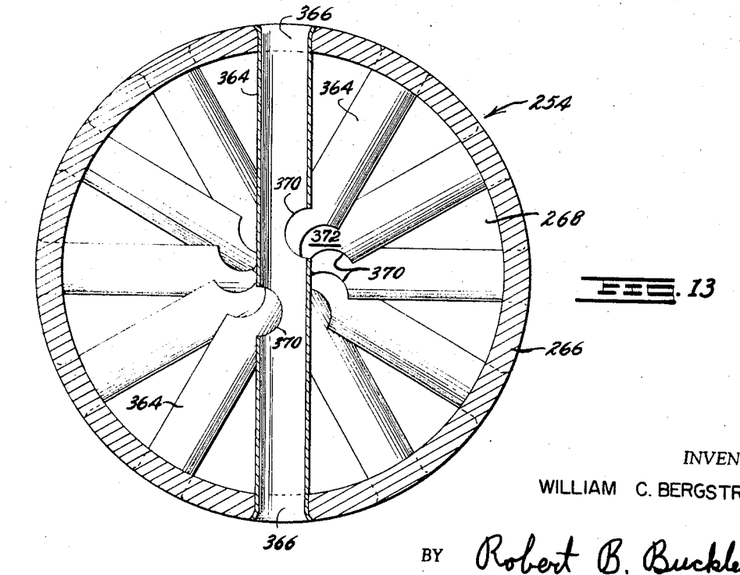

The embodiment of the invention shown in FIGURES 11 to 13, briefly stated, is a two-stage centrifugal separator wherein, in purifying lubricating oil, heavier impurities, such as sludge, are removed in the first stage, and lighter impurities, such as fine metallic particles, are separated in the second stage.

The separator includes a housing having an inlet opening for the entry of a mixture of materials to be separated and an egress opening for the outflow of separated lighter material. A hollow rotor is rotatably supported inside the housing and is spaced from the housing. The rotor has a drive connection to be driven by a source of power for rotating the rotor inside the housing. A wall extends across the rotor and separates the interior of the rotor into a first-stage separation chamber and a second-stage separation chamber. The inlet extends into the rotor for supplying the mixture of materials, such as dirty lubricating oil, to the interior of the first-stage separation chamber.

A baffle is mounted inside the first-stage separation chamber for initialy directing the dirty oil outwardly. Vanes are provided in the first-stage separation chamber for accelerating the dirty oil to rotation. Slots are formed in the rotor casing between the vanes to permit the sludge to pass from the first-stage separation chamber to the space between the rotor and housing and to a sump connected to the bottom of the housing.

For further purification, the oil passes to the second-stage separation chamber containing diametral outlet pipes, as seen in FIGURES 11 and 12. Impurities collect on the inner surface of the rotor casing. The purified oil collects at the axial zone of the second-stage separation chamber and passes through entrance openings in the outlet pipes, through the outlet pipes to the space between the rotor and housing, and out the egress opening for return to the engine.

The first stage of the separtor of FIGURES 11 to 13 can be employed alone as a single-stage separator, as in separating water from jet engine fuel.

There now follows a detailed description of the inventive embodiment shown in FIGURES 1 to 3. The centrifugal separator 20 includes a housing 22 adapted to be mounted on the accessory drive pad of an engine. A hollow rotor or drum 24 is rotatably mounted inside the housing 22. A cartridge or insert 26 is received inside the rotor 24 and has an unobstructed axial zone 28. The rotor 24 is provided with a driven shaft 30 rotatably received in an opening formed in housing 22 and connectable to a source of power for rotating the rotor.

For delivery of a mixture of materials of different densities, such as dirty lubricating oil, to the rotor 24, an inlet opening 32 extends through the housing 22 and rotor 24. A baffle 40 is mounted adjacent the inner end of inlet opening 32 for initially directing the dirty oil outwardly toward the inner surface of shell or wall 42 of cartridge 26. The cartridge 26 has a plurality of circumferentially-spaced vanes 44 formed thereon that extend inwardly toward the axis and serve to accelerate to rotation the dirty oil so that separation of the impurities by centrifugal action can occur. The sludge and other impurities collect in sludge trap zones 46 adjacent the inner surface 48 of cartridge shell 42 between vanes 44.

For removal of the purified oil, radial channels 50 are formed in vanes 44 at positions spaced along the length thereof. The channels 50 extend through shell 42 of cartridge 26 and, when the cartridge is assembled in the rotor, as shown in FIGURES 1 and 2, register with holes 52 formed in the wall or casing 54 of rotor 24, thereby providing passages for the outflow of oil from axial zone 28 to annular space 56 between rotor 24 and housing 22.

The housing 22 includes a generally-cylindrical tube or jacket 60 having enlarged flanges 62 and 64 at opposite ends with bolts 66 threadedly received in holes formed therein. The bolts connect the tube 60 to drive end plate 68 and an inlet end plate 70. Drive end plate 68 has an attachment flange 72 formed thereon with holes 74 therein adapted for bolting to the accessory drive pad of an engine, or other mounting. Drive end plate 68 has another flange 76 abutting tube flange 64. The flange 76 has holes receiving bolts 66. Nuts 80 engage the outer ends of bolts 66 and releasably secure the drive end plate 68 to tube 60.

Inlet end plate 70 has a flange 82 abutting the tube flange 62 at the opposite end of tube 60. The flange 82 has holes formed therein receiving bolts 66. Nuts 84 engage the outer ends of bolts 66 and releasably secure the inlet end plate 70 to tube 60.

For outflow of purified oil, an egress opening 86 extends through a boss 88 formed on the lower portion of housing tube 60.

The rotor casing or wall 54 has the shape of a right-circular cylinder. A drive end cover 90 and an inlet end cover 92 are releasably connected to its opposite ends. Drive end cover 90 has a flange 94 abutting an enlarged rim of the rotor casing 54 and joined by bolts 96 and nuts 98 thereto. Similarly, the inlet end cover 92 has a flange 100 abutting the opposite enlarged rim of rotor casing 54 and joined thereto by bolts 102 and nuts 104.

For journaling the drive end of rotor 24 in housing 22, the stub shaft 30 is received in an opening formed in drive end plate 68 and spaced therefrom by a cylindrical bushing 106. An annular seal 108 surrounds the outer end of stub shaft 30 and abuts the bushing 106 and the drive end plate 68 to seal the interior of housing 22.

The stub shaft 30 has a flange 110 received in a recess formed in rotor cover 90 and releasably connected thereto by bolts 112 and nuts 114. For driving the rotor 24, a drive shaft 116 has splines 118 formed thereon for connection to a power source (not shown). The drive shaft 116 is received in a central aperture in stub shaft 30 and connected thereto by a shear coupling.

For rotatably journaling the inlet end of rotor 24 in the housing 22, and for providing a passage for inflow of the mixture of materials to be separated, a stub shaft 120 is received in an inlet opening formed in housing inlet end plate 70 and spaced therefrom by a cylindrical bushing 122. The stub shaft 120 functions also as an inlet pipe and has axial inlet opening 32 extending therethrough registering with an opening formed in rotor inlet cover 92 to provide a passage for the flow of dirty oil into the interior of rotor 24.

The baffle plate or disc 40 extends across the inlet opening 32 for initially directing the dirty oil outwardly toward the inner surface 48 of cartridge shell 42. The baffle 40 is located by spacers or legs 130 at a desired distance from rotor inlet cover 92. Bolts 132 and nuts 134 connect the baffle 40 and spacers 130 to the inner surface of rotor inlet cover 92, and connect the flange 136 of stub shaft 120 to the outer surface of rotor inlet cover 92.

In the embodiment shown in FIGURES 1 to 3, the rotor includes the replaceable and disposable cartridge 26 formed of low-cost material that is sufficiently flexible to allow easy insertion and removal of the cartridge into and out of rotor 24. Among the materials that can be employed are synthetic resin plastic compositions, such as asbestos-filled phenol-formaldehyde resin, and the like. The cartridge 26 can be cast to the shape shown. The cartridge can be of one-piece construction or made up of sections arranged end-to-end in the rotor to facilitate insertion and removal.

The cartridge 26 has two ridges 140 formed at diametrically-opposite positions on its outer surface. The ridges are matingly received in slots 142, as seen in FIGURES 2 and 3, formed on the inner surface of rotor casing 54, thereby locating the outlet channels 50 in registry with the holes 52 formed in rotor casing 54. The channels 50 have entrance openings 144 located adjacent the axial zone 28 for receiving purified oil. The entrance openings 144 are located at positions spaced from the inner surface of shell 42 by a distance greater than one-half the inside radius of shell 42.

The operation of the embodiment of FIGURES 1 to 3 will now be described with respect to the purification of lubricating oil contaminated with various materials, such as sludge and metal particles. The power source (not shown) is engaged with the splines 118 to rotate the rotor 24 within the housing 22.

The impure oil is pumped into the rotor 24 through inlet opening 32. The stream of impure oil encounters baffle 40 and is directed outwardly toward the inner surface 48 of cartridge shell 42. The mixture is accelerated to rotation by the vanes 44. The baffle 40 prevents the dirty oil, containing the contaminants, such as sludge particles, from passing directly into one of the entrance openings 144 closely adjacent to inlet opening 32, and from returning to the engine unpurified.

By the difference in densities, the centrifugal separation deposits the sludge and other heavier contaminants in sludge trap zones 46. The oil is pumped in under pressure, such as about ten pounds per square inch gauge, so as to prevent the formation of a vacuum at axial zone 28, and thereby maintain a continuous liquid oil phase across axial zone 28. The purified oil migrates toward the unobstructed axial zone 28, enters entrance openings 144, passes through outlet channels 50 and holes 52 into annular space 56. Thereafter, the purified oil passes outwardly through egress opening 86 to return to the engine.

Efficient separation is produced in part because the outlet channels extend along radii, whereby the inertia of the purified oil, imparted to it by rotation of the rotor 24, is partly in the direction of the outlet channels so as to impel the oil outwardly through the channels. A further factor is the location of the entrance openings 144 closely adjacent the axis where the purest oil is obtained.

For cleaning, the separator 20 is partially disassembled to remove accumulated sludge at time periods determined by service experience. It is not necessary to remove the entire separator from the engine to perform the cleaning operation unless space limitations require such removal. Where removal of the entire separator is not necessary, the nuts 84 are removed and the housing inlet plate 70 removed. The entire rotor 24 is withdrawn and rotor inlet cover 92 removed by removal of nuts 104. The dirty cartridge 26 is then removed, discarded, and replaced by a clean cartridge. Metallic parts can be cleaned by immersion in cleaning solution. The separator is reassembled and ready for further use.

The embodiment shown in FIGURES 4 and 5 is generally similar to that shown in FIGURES 1 and 3 and like parts have like reference numerals. The centrifugal separator 152 of FIGURES 4 and 5 differs in that there is no separate cartridge. Rather, the rotor 154 includes a wall or casing 156 with integral vanes 158 extending inwardly therefrom and having radial channels 160 formed therein for flow of the purified oil from the axial zone 162 to the annular space 164 between the rotor 154 and the housing 22. The entire rotor can be formed of synthetic resin plastic. The rotor can be disposed of, and replaced with a clean rotor, upon periodic cleanings of the separator.

In the embodiment of the invention shown in FIGURES 6 to 8, the structure of the housing and drive connections, is similar to the foregoing embodiments, and like elements have like reference numerals. In the drive connection, a snap ring 170 provides positive locking of drive shaft 116 to stub shaft 30. In the separator 172 of FIGURES 6 to 8, the rotor or drum 174 includes a cylindrical casing or wall 176 and a drive end cover 180 and an inlet cover 182 joined to opposite ends thereof by bolts (not shown).

The inlet end cover 182 has a stub shaft 184 formed integrally therewith and received in a bushing 186 located in an opening formed in housing inlet end plate 70. The stub shaft 184 serves to journal one end of the rotor 174 in housing 22. Further, the stub shaft 184 serves as an inlet pipe and has an axial inlet opening 190 formed therein for delivering the dirty oil to the interior of the rotor 174.

Baffle 192 extends across the inlet opening 190 and initially directs the dirty oil outwardly toward the inner surface of casing 176. Baffle 192 is connected to inlet cover 182 by spacers or legs 193. For accelerating the dirty oil to rotation, vanes 194 extend inwardly from casing 176 at circumferentially-spaced positions and form sludge trap zones 196 therebetween.

For removal of the purified oil, hollow outlet pipes 200 extend diametrally across the rotor 174 at spaced positions along the length of the rotor. Each outlet pipe 200 has its exit ends 202 flared to engage beveled apertures in the rotor casing 176 to provide a secure and firm locking of the pipes in the rotor. This tends to reduce vibration and looseness of parts. Each pipe forms an outlet channel 203. The exit ends 202 of the outlet pipes deliver purified oil to the annular space or chamber 56. While the exit ends 202 are shown located between adjacent pairs of vanes 194, the exit ends can also be seated in the vanes.

Each outlet pipe 200 has two arcuate entrance openings 204 formed therein adjacent to and on opposite sides of the axis of rotation of rotor 174. The successive outlet pipes 200 extend in circumferentially-spaced, angularly displaced, or angularly-rotated positions across the rotor 174 so that the entrance openings 204 will receive purified oil from various locations around the axis of rotation of rotor 174. This construction further tends to make the rotor rigid and resistant to vibration.

The axial zone 206 is unobstructed, except for outlet pipes 200, so as to provide flow paths for direct radial communication between the axis, entrance openings 204, and the inner surface of casing 176.

In the operation of the embodiment shown in FIGURES 6 to 8, the sludge and other contaminants are deposited in sludge trap zones 196. The purified oil collects at axial zone 206, passes through entrance openings 204 through the outlet channels 203 formed by outlet pipes 200, into space 56, and out through egress opening 86 for return to the engine.

Upon periodic cleaning of the separator, where space limitations do not require the removal of the entire separator from the engine, the housing inlet end plate 70 is removed and the rotor 174 withdrawn from the housing 22. The rotor 174 is then disassembled by removing both covers 180 and 182. All the parts are immersed in cleaning solution, scraped clean, flushed and reassembled.

A centrifugal separator according to the invention can be made with other forms of outlet pipes, such as those having a length approximately equal to the radius of the rotor 174, as disclosed in my application Serial No. 750,632 for Separator, filed July 24, 1958, and now abandoned.

The embodiment of the invention shown in FIGURES 9 and 10 is generally similar to that shown in FIGURES 6 to 8, and like elements have like reference numerals. The centrifugal separator 208 of FIGURES 9 and 10 differs in that the entrance openings 210, of the outlet pipes 212, are located at the axis of the rotor 174, so as to collect the purest oil.

There now follows a detailed description of the embodiment of the invention shown in FIGURES 11 to 13. The two-stage centrifugal separator 250 includes a housing 252 and a rotor 254 rotatably journaled inside said housing. The housing 252 includes a generally-cylindrical tube 256 with an inlet end plate 258 and a drive end plate 260 removably secured to opposite ends thereof. Drive end plate 260 includes an attachment flange 262 for attachment to the accessory drive pad of an engine, or other mounting. The drive end plate 260 abuts an enlarged end of tube 256 and is releasably secured thereto by bolts (not shown).

The inlet end plate 258 has an outer flange 264 abutting the opposite enlarged end of tube 256 and is releasably secured thereto by bolts (not shown).

The rotor or drum 254 includes a cylindrical casing or wall 266 and a drive end cover or panel 268. An inlet end cover 270 abuts flange 272 at the inlet end of casing 266 and is releasably secured thereto by bolts (not shown). A transverse wall 274 separates the interior of rotor 254 into a first-stage separation chamber 280 and a second-stage separation chamber 282.

An annular receiving chamber 284, for the reception of centrifuged heavy material, is formed between the casing 266 and the tube 256 adjacent the first-stage separation chamber 280. Similarly, another annular receiving chamber 290, for the reception of purified lighter material, is formed adjacent the second-stage separation chamber 282 between the rotor 254 and the housing 252. These chambers are separated by a pair of flexible annular discs or seals 292 sealingly and slidably engaging a liner 294 secured to an inner shoulder 296 formed on the inner surface of tube 256. The rings 292 are tightly positioned in slots formed in the annular support 298 secured to a ridge 300 formed on the outer surface of rotor 254.

A stub shaft 310 is received in a bushing 312 located in an inlet opening formed in housing inlet end plate 258. The stub shaft 310 has a flange 314 seated in a recess formed in rotor cover 270 and secured thereto. Thereby, the stub shaft 310 journals one end of the rotor in housing 252. The stub shaft 310 also serves as an inlet pipe, having an axial inlet opening 316 formed therein registering with an opening formed in rotor inlet end cover 270, thereby providing a passage into the interior of rotor 254 for entry of a mixture of materials to be separated.

At the opposite end of the separator 250, a stub shaft 318 is rigidly secured to the drive end panel 268 of the rotor 254. A bushing 320 surrounds the stub shaft 318 and is received in an opening formed in housing drive end plate 260. An annular seal 322 is seated in a slot formed in plate 260 and sealingly engages the shaft 318 to prevent leakage of liquids from the inside of separator 250.

Rotor 254 is rotated by a suitable source of power (not shown) connectable with splines 330 formed on the outer end of shaft 18.

The first-stage separation chamber 280 includes a baffle plate 332 mounted adjacent to and extending across inlet opening 16. Spacers or legs 334 connect the baffle 332 to cover 270. The baffle 332 directs the mixture of materials, such as dirty oil or a mixture of gasoline and water, initially outwardly toward the casing 266, thereby aiding in moving the heavier materials, such as sludge, to the outer portions for subsequently removal to the annular receiving chamber 284.

In order to accelerate the mixture to rotation in the first-stage separation chamber 280, a plurality of vanes are formed integrally with the casing 266 at circumferentially-spaced positions around rotor 254, and extend inwardly as seen in FIGURE 12. High vanes 336 are positioned alternately with low vanes 338. The high vanes 336 have greater radial depths than the low vanes 338.

Each vane tapers inwardly from a greater width at its radially-outer portion to a smaller width at its radially-inner portion. Thereby, flow paths are provided between the vanes.

For the removal of sludge, water and other heavy materials from first-stage separation chamber 280, a plurality of slots 340 are formed in casing 266 between the vanes 336 and 338.

The materials of higher densities pass through the slots 340 into annular receiving chamber 284. These materials then pass through opening 342 formed in housing tube 256, through a diminished lower opening 344 in frusto-conical cup 346 into the bottom of a sump 348 releasably secured to a flange 350 on the tube 256, as by bolts (not shown). The frusto-conical cup 346 has its upper rim releasably grasped between the upper edge of sump 348 and flange 350. The cup 346 extends downwardly and inwardly from the top of sump 348 for suppressing turbulence in the sump and thus aiding in maintaining heavy materials, such as sludge, water, and the like in the bottom of the sump. Gravity assists in moving the heavy sludge through the opening 342. The diminished size of the opening 344 tends to prevent the sludge from being swept back into the rotor 254 by the fluid currents existing when the rotor is rotated during operation of the separator.

The partially-purified oil collects at the unobstructed axial zone 360 of first-stage separation chamber 280. For further purification, the oil passes through central aperture 362 formed in transverse wall 274 into second-stage separation chamber 282.

For outflow of purified oil from second-stage separation chamber 282, a plurality of diametral hollow outlet pipes 364 extend across the chamber 282 and through the rotor casing 266 with their exit ends 366 communicating with the annular chamber 290. The exit ends 366 are flared outwardly to seat in mating beveled apertures in rotor casing 266 to anchor firmly the pipes 364 in the rotor casing 266, thereby reducing vibration and making the structure rigid. Each outlet pipe 364 has two arcuate entrance openings 370 formed therein adjacent to and on opposite sides of the axis of rotation of rotor 254.

As seen in FIGURES 11 and 13, the outlet pipes are spaced along the length of rotor 254. Also, the successive outlet pipes 364 extend in circumferentially-spaced or angularly-rotated positions across the rotor 254 so that the entrance openings 370 will receive purified oil from various locations around the axis of rotation of rotor 254. This configuration further contributes to increased rigidity, reduced vibration, and durability. The axial zone 372 of second-stage separation chamber 282 is obstructed only by the portions of pipes 364 at the axis. A final egress opening 380, for the purified oil, extends through a boss 382 formed in the lower portion of housing tube 256.

The operation of the embodiment of FIGURES 11 to 13 will now be described with respect to the purification of lubricating oil contaminated with sludge and metal particles. The power source is engaged with the splines 330 to rotate the rotor 254 within the stationary housing 252. The impure oil is then pumped in through inlet opening 316, under sufficient pressure to prevent the formation of a vacuum at the axis of rotor 254. The stream of impure oil encounters the baffle plate 332 and is directed to the outer portions of first-stage separation chamber 280, the rotation of casing 266, and the impelling action of vanes 336 and 338, cause the impure oil to rotate. The materials higher density, such as sludge particles, having a greater mass per unit volume, move outwardly and through the slots 340 into the annular first-stage receiving chamber 284. The oil particles, of lesser density, are displaced inwardly toward the axial zone 360.

The sludge particles are then moved, by inertia and gravity, downwardly from annular chamber 284, through opening 342 and through diminished opening 344 in cup 346 into the bottom of sump 348. The sump 348 can be periodically removed for cleaning.

The oil, partially purified by removal of sludge, then passes through the aperture 362 to the second-stage separation chamber 282. In this chamber, the metal particles and other impurities are moved; by the operation of their differential densities with the oil, and the rotation of the mixture; to the outer portions of chamber 282. These heavier materials collect on the inner surface of rotor casing 266.

The substantially-pure oil is moved toward and collects at the axial zone 372 of chamber 282, which is obstructed only by the outlet pipes 364. This purified oil passes through the entrance openings 370 into pipes 364, through the outlet channels formed by pipes 364, into annular second-stage receiving chamber 290. Then the oil passes through egress opening 380 out of the separator 250 for return to the engine as a purified lubricant.

For periodic cleaning, housing inlet end plate 258 can be removed and the rotor 254 withdrawn. The rotor cover 270 is removed, all parts immersed in cleaning solution, scraped, and flushed. Then the parts are reassembled.

The first stage of separator 250 can be employed alone as a single-stage separator, as in separating water from jet engine fuel. In such uses, the mixture of fuel and water is pumped in through inlet opening 316. The purified fuel collects at axial zone 360 and passes through aperture 362 and suitable conduits to the engine. The heavier water collects in sump 348. Automatic electrical discharge apparatus can be provided in sump 348 for automatically initiating discharge of water from the bottom of the sump when the water reaches a predetermined level. The apparatus automatically stops the discharge when the water is drained to a lower level. Such devices are known and employ means for sensing electrical conductivity to actuate the apparatus.

Thus it will be seen that the invention provides an improved centrifugal separation system including processes for efficiently achieving separation; and centrifugal separators having the advantages of simple and durable construction, efficient separation of mixtures of materials of different densities, and convenient cleaning.

While presently preferred embodiments of the invention have been illustrated and described, it will be recognized that the invention can be otherwise variously embodied and practiced within the scope of the subjoined claims.

I claim:

1. A multiple-stage separator for separating a mixture of materials having different densities, said separator comprising a hollow rotor mounted for rotation about an axis; a transverse wall within said rotor separating the interior of said rotor into a first-stage separation chamber and a second-stage separation chamber, said transverse wall having a central aperture for the passage of material from said first-stage separation chamber to said second-stage separation chamber; an inlet extending from the exterior of said separator and opening into said first-stage separation chamber, said rotor having at least one exit opening formed therein at the periphery of said first-stage separation chamber for the passage of heavy materials outwardly from said first-stage separation chamber; and, a plurality of outlet pipes located in said second-stage separation chamber, each said outlet pipe having at least one entrance opening located at a position spaced from the surface of said second-stage separation chamber by a distance greater than one-half the inside radius of said second-stage separation chamber, said outlet pipes extending diametrally across said second-stage separation chamber, each said outlet pipe having its opposite ends anchored in the rotor portion surrounding said second-stage separation chamber, said outlet pipes being spaced along the length of said rotor, said outlet pipes extending across said rotor at positions angularly rotated from each other.

2. A multiple-stage separator for separating a mixture of materials having different densities, said separator comprising a housing; a hollow rotor supported within said housing for rotation relative to said housing and around an axis; a transverse wall within said rotor separating the interior of said rotor into a first-stage separation chamber and a second-stage separation chamber, said rotor being spaced from said housing to form a first receiving chamber between said rotor and said housing adjacent said first-stage separation chamber and a second receiving chamber between said rotor and said housing adjacent said second-stage separation chamber; means between said rotor and said housing forming a fluid-tight seal between said first receiving chamber from said second receiving chamber; said transverse wall having a central aperture for the passage of material from said first-stage separation chamber to said second-stage separation chamber, an inlet extending from the exterior of said separator and opening into said first-stage separation chamber, said rotor having at least one exit opening formed therein at the periphery of said first-stage separation chamber for the passage of heavy materials outwardly from said first-stage separation chamber; at least one outlet pipe located in said second-stage separation chamber, said outlet pipe having at least one entrance opening located at or adjacent said axis of rotation, said outlet pipe extending through said rotor and having an axit end communicating with said second receiving chamber, said housing having an egress opening formed therein communicating with said second receiving chamber for the outflow of separated lighter material from the separator.

3. The invention as set forth in claim 2 wherein said sealing means includes a flexible sealing ring secured to said rotor and slidingly engaging the inner surface of said housing.

4. The invention as set forth in claim 2 wherein said housing has an opening formed in the lower part thereof and communicating with said first receiving chamber, and including a sump releasably secured to said housing beneath said opening.

5. The invention as set forth in claim 4 and including a cup in said sump extending downwardly and inwardly thereof, said cup having a diminished opening at the lower end thereof.

6. A multiple-stage separator for separating a mixture of materials having different densities, said separator comprising a non-rotatable housing; a hollow drum journaled within said housing for rotation about an axis; a transverse wall within said drum separating the interior of said drum into a first-stage separation chamber and a second-stage separation chamber, said transverse wall having an aperture extending therethrough for the passage of material from said first-stage separation chamber to said second-stage separation chamber; an inlet extending from the exterior of said housing through said housing and through said drum at the axis of rotation thereof and into said first-stage separation chamber; a baffle plate mounted within said first-stage separation chamber and secured to said drum, said baffle plate being spaced from the end of said drum and extending over at least the area of said inlet; a plurality of circumferentially-spaced vanes extending inwardly within said first-stage separation chamber, said drum having slots formed therein between said vanes; and, a plurality of outlet pipes extending diametrically across said second-stage separation chamber, each said outlet pipe having at least one entrance opening located adjacent the axis of rotation of said drum, said outlet pipes having their exit ends communicating with the space between said drum and said housing, said outlet pipes being spaced along the length of said drum, said outlet pipes extending across said drum at positions angularly rotated from each other.

7. A multiple-stage separator for separating a mixture of materials having different densities, said separator comprising a non-rotatable housing; a hollow drum journaled within said housing for rotation about an axis; a transverse wall within said drum separating the interior of said drum into a first-stage separation chamber and a second-stage separation chamber, said first-stage separation chamber being coaxial with said second-stage separation chamber, said transverse wall having an aperture extending therethrough for the passage of material from said first-stage separation chamber to said second-stage separation chamber; an inlet extending from the exterior of said housing through said housing and through said drum at the axis of rotation thereof and into said first-stage separation chamber; said housing being spaced from said drum to form a first receiving chamber between said drum and said housing adjacent said first-stage separation chamber and a second receiving chamber between said drum and said housing adjacent said second-stage separation chamber, said drum having at least one exit opening formed therein at the periphery of said first-stage separation chamber for the passage of heavy materials outwardly from said first-stage separation chamber into said first receiving chamber, means forming a seal between said drum and said housing between said receiving chambers; at least one outlet pipe having an entrance opening located adjacent the axis of rotation of said second-stage separation chamber, said outlet pipe extending through said drum and having an exit end communicating with said second receiving chamber, said housing having an egress opening formed therein communicating with said second receiving chamber for the outflow of separated lighter material from the separator, the axial space of said separation chambers being substantially open and unobstructed.

8. A centrifugal separator for separating a mixture of materials having different densities, said separator comprising a housing; a hollow rotor supported in said housing for rotation about an axis, said rotor including a casing spaced from said housing to provide a receiving chamber between said rotor and said housing; an inlet opening into the interior of said rotor at the axis thereof for delivering a mixture of materials thereto; a baffle mounted inside said rotor adjacent said inlet for initially directing the mixture of materials outwardly of said rotor; said casing having vanes formed thereon and extending inwardly of said rotor at positions spaced around the circumference thereof; said casing having slots formed therein between said vanes for the outflow of separated material of greater density to said receiving chamber; said rotor including a wall opposite said inlet, said rotor having an unobstructed axial zone between said baffle and said wall for the collection of material of lesser density; said wall having an outlet aperture formed therein at the axis of the rotor for the outflow of separated material of lesser density; said housing having an opening formed in the lower part thereof and communicating with said receiving chamber; a sump releasably secured to said housing beneath said opening for the collection of separated material of greater density; and, a cup in said sump extending downwardly and inwardly thereof, said cup having a diminished opening at the lower end thereof, said cup being located above the bottom of said sump to form a lower space in said sump below and around said cup for the collection of material of greater density, said lower space being substantially masked by said cup from the rotor fluid currents and thus relatively tranquil.

9. In a multiple-stage separator for separating a mixture of materials having different densities, a hollow rotor supported for rotation about an axis, means within said rotor dividing the interior of said rotor into a first-stage separation chamber and a second-stage separation chamber, an inlet extending from the exterior of said separator and opening into said first-stage separation chamber for the delivery thereto of a mixture of materials, means for directing said mixture initially outwardly toward the periphery of said first-stage separation chamber, means in said first-stage separation chamber presenting surfaces for accelerating to rotation the mixture of materials, said rotor including a first wall portion surrounding said first-stage separation chamber and having at least one exit opening formed therein for the passage of more dense material outwardly from said first-stage separation chamber, said first-stage separation chamber having an unobstructed axial zone extending between said initially-directing means and the surface of said first-stage separation chamber opposite said inlet, said axial zone being adapted for the collection of separated less dense material, the length of said exit opening, measured parallelly to said axis, being radially aligned with unobstructed axis, said first-stage separation chamber providing unobstructed radial flow paths from said unobstructed axis to said exit opening, said rotor including a passageway for passing separated collected less dense material from said axial zone of said first-stage separation chamber into said second-stage separation chamber, said rotor including a second wall portion surrounding the second-stage separation chamber, said second-stage separation chamber having at least one outlet channel formed therein, the axis of said second-stage separation chamber being unobstructed except for the structure forming said at least one outlet channel, the said outlet channel having an entrance opening located at or adjacent the axis of rotation so as to receive separated less dense material, said outlet channel extending through said second rotor wall portion and communicating with the space outside said rotor, said at least one channel being the only outlet from said second-stage separation chamber so that additional more dense material separated in said second-stage separation chamber collects adjacent the inner surface of said second rotor wall portion for removal upon periodic cleaning.

10. In a centrifugal separator for separating a mixture of materials having different densities, a hollow rotor adapted for rotation about an axis, said rotor including a casing extending around its periphery, an inlet opening into the interior of said rotor for delivering thereto a mixture of materials, means for directing the mixture of materials initially outwardly toward the inner surface of said casing, vanes extending inwardly of said rotor at positions spaced around the circumference of said rotor, said vanes having surface means for accelerating to rotation the mixture of materials, vanes of greater radial depth alternating in position around said rotor with vanes of lesser radial depth, said casing having slots formed therein between said vanes for the passage of material of greater density from the interior of said rotor to the space outside said rotor, said rotor having an unobstructed axial zone on the side of said initially-directing means farthest from said inlet, the interior of said rotor providing unobstructed radial flow paths extending from said unobstructed axis through said slots to the space outside said rotor, said rotor having an outlet for removing the less dense material collected at said axial zone.

11. In a centrifugal separator for separating a mixture of materials of different densities and including a hollow rotor adapted for rotation about an axis, said rotor including vanes in its hollow interior and located at positions spaced around the circumference of said rotor, said vanes having surface means for accelerating to rotation a mixture of materials in said rotor interior; the improvement which comprises said vanes including vanes of greater radial depth alternating in position around said rotor with vanes of lesser radial depth.

12. A multiple-stage separator for separating a mixture of materials having different densities, said separator including a non-rotatable housing; a hollow rotor journaled inside said housing for rotation around an axis; said rotor including means generally transverse of said axis and dividing the interior of said rotor into a first-stage separation chamber and a second-stage separation chamber, said rotor being spaced from said housing to form a first receiving chamber between said rotor and said housing adjacent said first-stage separation chamber and a second receiving chamber between said rotor and said housing adjacent said second-stage separation chamber; means between said rotor and said housing sealing said first receiving chamber from said second receiving chamber; said rotor including a casing having the shape of a right circular cylinder and covers at its opposite ends, an inlet extending from the exterior of said separator and opening into said first-stage separation chamber for the delivery thereto of a mixture of materials to be separated; means for initially directing said mixture entering said first-stage separation chamber outwardly toward the inner surface of said casing, said transverse dividing means including an aperture at the axis for the passage of partially-purified less dense material from said first-stage separation chamber to said second-stage separation chamber, said aperture having an area that is a small fraction of the cross-sectional area of said casing, said first-stage separation chamber hving an unobstructed axial zone between said initially-directing means and said aperture for collecting partially-purified less dense material and transmitting it to said aperture, said casing having at least one exit opening formed therein and joining said first-stage separation chamber to said first receiving chamber for the centrifugal outflow of more dense material, said second-stage separation chamber including outlet means for receiving further-purified less dense material at or adjacent said axis and flowing the further-purified less dense material through said casing into said second receiving chamber, said outlet means being the only outlet from said second-stage separation chamber so that additional more dense material separated in said second stage separation chamber collects adjacent the inner surface of said casing in said second-stage separation chamber for removal upon periodic cleaning, said housing having an egress opening formed therein joining said second receiving chamber to the space outside said separator for the outflow of further-purified less dense material.

13. A rotor for use in a centrifugal separator for separating heavy impurities from liquid petroleum products comprising
a rotor having a peripheral wall extending about an axis,
means for mounting the rotor for rotation within a housing about said axis,
inlet opening means for delivering a mixture of liquid and heavy impurities to the interior of the rotor at a point spaced radially in from the peripheral wall,
a walled outlet channel means in the rotor for delivering the purified liquid to the space between the rotor and the housing through the peripheral wall including
an imperforate channel wall structure extending from the rotor peripheral wall to an entrance opening spaced radially inwardly of the peripheral wall,
a central passage within the imperforate structure extending from the said entrance opening and through the peripheral wall,
end wall means on the rotor extending radially inwardly from the peripheral wall about its full circumference at axially spaced positions on opposite sides of the outlet channel means,
said rotor being free of openings except for said inlet opening and said outlet channel's entrance opening to form a trap chamber means for the accumulation of heavy impurities, and
mixture directing means within the rotor for directing material from the inlet means to a position radially outwardly of the entrance opening in the outlet channel means.

14. The structure of claim 13 in which the outlet channel wall is imperforate from the peripheral wall to an entrance opening spaced from the peripheral wall more than one-half of the radial distance between the peripheral wall and the rotor axis.

15. The structure of claim 13 in which the outlet channel means includes a hollow tube extending completely across the rotor diameter and having each end secured in liquid-tight engagement to the peripheral wall.

16. The structure of claim 15 in which the entrance opening in the imperforate wall of the diametral outlet channel faces away from the inlet opening for the material mixture, and the means for directing the mixture radially outwardly is a portion of the channel imperforate wall.

17. The structure of claim 13 including a plurality of vane means extending radially inwardly from the peripheral wall for accelerating the mixture of materials to rotation.

18. The structure of claim 17 in which the outlet channel means include passages extending through the vane means from the inner end and through the peripheral rotor wall.

19. The structure of claim 13 including a non-rotatable housing mounted about the said rotor shaped to serve as a reservoir means for the reception of a purified liquid and having an egress opening for the continuous delivery of purified liquid therefrom.

20. The structure of claim 19 in which said egress opening is located in a portion of the housing located radially outward of the rotor peripheral wall whereby centrifugal force assists the discharge of purified liquid from the housing.

21. The structure of claim 13 including
means for mounting the rotor in a fixed position within a rotatable outer casing having an outer peripheral wall having passage means therein for alignment with the openings in the rotor,
means for holding the rotor in the outer casing with the said openings aligned, and
end plate means secured to the outer casing for holding the rotor in position in the outer casing.

22. The structure of claim 21 in which
a central stub shaft is secured to the end plate means in position to serve as the rotor axis,
said stub shaft and end plate means having aligned axial openings therein to serve as the mixture inlet means.

23. The structure of claim 13 including a preliminary separator stage having a rotor coaxial with the axis of the first mentioned rotor, a housing surrounding said preliminary stage rotor, an opening through the peripheral wall of said preliminary stage rotor leading to said housing, and an opening from said second stage rotor spaced radially inwardly of its peripheral wall leading to the inlet opening of the first mentioned rotor.

24. A rotor for use with a centrifugal separator for the separation of heavy impurities from a liquid comprising
a rotor having an imperforate peripheral wall means surrounding a rotor axis for trapping heavy impurities therein,
outlet channel means for light materials comprising a hollow tube extending across a diameter of the rotor from one peripheral wall to the other between spaced imperforate end walls secured to the peripheral wall at each end,
at least one entrance opening in the diametral tube spaced inwardly from the peripheral wall, and
an exit opening from the tube interior at each of its ends extending through the adjacent peripheral wall,
each end of said diametral tube and said end wall means being in liquid-tight engagement with the peripheral wall and being imperforate from the peripheral wall to a point spaced radially inwardly from all portions of the peripheral wall whereby a liquid-tight trap chamber for the accumulation of heavy impurities within the rotor is formed with the rotor peripheral wall and the end walls.

25. The structure of claim 24 including a plurality of similar diametral outlet tubes spaced axially between the mixture inlet opening and the opposite end of the rotor.

26. The structure of claim 25 in which each of the diametral tubes is located in a different radial plate from the other diametral tubes.

27. The structure of claim 24 in which the tube entrance opening faces away from the rotor inlet opening and the diametral tube is imperforate in the direction facing the rotor inlet opening.

28. A rotor for use as a replaceable cartridge for accumulating heavy impurities in a centrifugal separator comprising
a substantially cylindrical wall,
a plurality of radial vanes integral with the peripheral wall and extending radially therein to a point spaced outwardly from the axis,
said radial vanes having channels therein opening to the inner ends of the vanes and through the peripheral wall,
said peripheral and radial walls being imperforate except for said channels, and
means on said rotor for securing the rotor within a mating substantially cylindrical shell.

References Cited

UNITED STATES PATENTS

| | | | |
|---|---|---|---|
| 45,737 | 1/1865 | Muir | 233—28 |
| 498,828 | 6/1893 | Wahlin | 233—28 X |
| 499,345 | 6/1893 | Peck | 233—46 X |
| 515,053 | 2/1894 | Nilsson | 233—40 |
| 562,782 | 6/1896 | Hoyt | 233—28 |
| 621,619 | 3/1899 | Salenius | 233—28 |
| 703,630 | 1/1902 | Ten Winkel | 233—21 |
| 723,932 | 3/1903 | Shue | 233—14 |
| 1,452,388 | 4/1923 | Porter et al. | 233—11 |
| 2,068,520 | 1/1937 | Strezynski | 233—47 |
| 2,109,234 | 2/1938 | Keenan | 233—14 |
| 2,110,778 | 3/1938 | Teatini | 210—381 X |
| 2,218,002 | 10/1940 | Hamilton | 4—258 |
| 2,439,177 | 4/1948 | Manning | 233—18 X |
| 2,483,342 | 9/1949 | Henrard | 233—46 X |
| 2,630,268 | 3/1953 | Abbott | 233—19 |
| 2,688,437 | 9/1954 | Monnet | 233—20 |
| 2,779,537 | 1/1957 | Madany | 233—15 |
| 2,911,139 | 11/1959 | Johnson | 233—47 X |

FOREIGN PATENTS

| | | |
|---|---|---|
| 427,616 | 4/1935 | Great Britain. |
| 37,291 | 5/1913 | Sweden. |

OTHER REFERENCES

A.P.C. 194,265, May 1943, Banning, 233–18.

M. CARY NELSON, *Primary Examiner.*

H. T. KLINKSIEK, *Assistant Examiner.*